US010315568B2

(12) United States Patent
Kadowaki et al.

(10) Patent No.: US 10,315,568 B2
(45) Date of Patent: Jun. 11, 2019

(54) VEHICLE PERIPHERAL DISPLAY DEVICE

(75) Inventors: Jun Kadowaki, Kariya (JP); Kazuya Watanabe, Anjo (JP); Takashi Yamanaka, Chita (JP); Yumi Yamanaka, legal representative, Chita (JP)

(73) Assignee: AISIN SEIKI KABUSHIKI KAISHA, Kairya-shi, Aichi-ken (JP)

( * ) Notice: Subject to any disclaimer, the term of this patent is extended or adjusted under 35 U.S.C. 154(b) by 1236 days.

(21) Appl. No.: 12/888,157

(22) Filed: Sep. 22, 2010

(65) Prior Publication Data

US 2011/0069169 A1    Mar. 24, 2011

Related U.S. Application Data

(62) Division of application No. 12/933,994, filed as application No. PCT/JP2009/058193 on Apr. 24, 2009, now abandoned.

(30) Foreign Application Priority Data

May 8, 2008  (JP) .................................. 2008-122557
Oct. 28, 2008  (JP) .................................. 2008-276859

(51) Int. Cl.
*H04N 7/18*      (2006.01)
*B60R 1/00*     (2006.01)
(Continued)

(52) U.S. Cl.
CPC ............ *B60R 1/00* (2013.01); *B62D 15/0275* (2013.01); *B60R 2300/105* (2013.01);
(Continued)

(58) Field of Classification Search
CPC .... H04N 7/181; G08B 13/19619; B60R 1/00; B60R 2300/105
(Continued)

(56) References Cited

U.S. PATENT DOCUMENTS 6,999,602 B2 *  2/2006  Yoshida et al. ............... 382/104
7,643,935 B2 *  1/2010  Sakakibara et al. .......... 701/494
(Continued)

FOREIGN PATENT DOCUMENTS

CN         1522892 A     8/2004
CN       101167104 A     4/2008
(Continued)

OTHER PUBLICATIONS

Extended European Search Report issued in the corresponding European Application No. 09742683.7 dated Mar. 27, 2012.
(Continued)

*Primary Examiner* — Shawn S An
(74) *Attorney, Agent, or Firm* — Sughrue Mion, PLLC

(57) ABSTRACT

The device is provided with an image acquisition unit for acquiring a peripheral image of a vehicle, the peripheral image being captured by an image pickup device provided to the vehicle; a display device for displaying the peripheral image, the display device being provided inside a vehicle cabin; and an indicator line output unit for causing an indicator line as a guide for a driver during a driving operation to be displayed superimposed on the peripheral image, at least one of a shadow portion and a side surface portion adjacent to the indicator line being added to the indicator line.

12 Claims, 11 Drawing Sheets

(51) Int. Cl.
*B62D 15/02* (2006.01)
*G08B 13/196* (2006.01)

(52) U.S. Cl.
CPC ... *B60R 2300/305* (2013.01); *B60R 2300/307* (2013.01); *B60R 2300/806* (2013.01); *G08B 13/19619* (2013.01); *H04N 7/181* (2013.01)

(58) Field of Classification Search
USPC .............................. 348/148, 149, 51, 46, 143
See application file for complete search history.

(56) References Cited

U.S. PATENT DOCUMENTS

| | | | |
|---|---|---|---|
| 7,812,741 B2 * | 10/2010 | Sakakibara ............ | G08G 1/168 340/932.2 |
| 8,218,007 B2 * | 7/2012 | Lee et al. ...................... | 348/148 |
| 2001/0030688 A1 | 10/2001 | Asahi et al. | |
| 2002/0026269 A1 | 2/2002 | Tanaka et al. | |
| 2002/0110262 A1 | 8/2002 | Iida et al. | |
| 2004/0119823 A1 | 6/2004 | Takagi et al. | |
| 2004/0153243 A1 | 8/2004 | Shimazaki et al. | |
| 2006/0022810 A1 | 2/2006 | Inoue et al. | |
| 2006/0287826 A1 | 12/2006 | Shimizu et al. | |
| 2007/0239357 A1 * | 10/2007 | Mori et al. .................... | 701/213 |
| 2008/0100614 A1 | 5/2008 | Augst | |
| 2008/0111669 A1 * | 5/2008 | Yamanaka ................ | B60R 1/00 340/435 |
| 2011/0181724 A1 * | 7/2011 | Kadowaki ................ | B60R 1/00 348/148 |

FOREIGN PATENT DOCUMENTS

| | | | | |
|---|---|---|---|---|
| EP | 1 160 146 | A2 | 12/2001 | |
| JP | 64-014700 | A | 1/1989 | |
| JP | 11-334470 | A | 12/1999 | |
| JP | 2001-010428 | A | 1/2001 | |
| JP | 2001-027535 | A | 1/2001 | |
| JP | 2001-180405 | A | 7/2001 | |
| JP | 2002-160597 | A | 6/2002 | |
| JP | 2002-297029 | A | 10/2002 | |
| JP | 2002-314991 | A | 10/2002 | |
| JP | 2004-056219 | A | 2/2004 | |
| JP | 2004-147083 | A | 5/2004 | |
| JP | 2004-203126 | A | 7/2004 | |
| JP | 2004-284370 | A | 10/2004 | |
| JP | 2004-345554 | A | 12/2004 | |
| JP | 2005-045602 | A | 2/2005 | |
| JP | 2006-040008 | A | 2/2006 | |
| JP | 2006-284458 | A | 10/2006 | |
| JP | 2007333502 | A * | 12/2007 | ............. G01C 21/00 |
| JP | 2007333502 | A * | 12/2007 | ............. G01C 21/00 |

OTHER PUBLICATIONS

Chinese Office Action issued in a corresponding Chinese Application No. 200980110661.7 dated Dec. 15, 2011.
International Search Report of PCT/JP2009/058193 dated Jun. 2, 2009.
Japanese Office Action dated Jul. 26, 2012 issued in Japanese Patent Application No. 2008276859.
Japanese Office Action, dated Mar. 7, 2013, issued in corresponding Japanese Application No. 2008-276859.

* cited by examiner

VEHICLE PERIPHERAL DISPLAY DEVICE

CROSS REFERENCE TO RELATED APPLICATIONS

This application is a divisional of U.S. application Ser. No. 12/933,994 filed Sep. 22, 2010, which is a National Stage of International Application No. PCT/JP2009/058193 filed Apr. 24, 2009, claiming priority based on Japanese Patent Application Nos. 2008-122557 filed May 8, 2008 and 2008-276859 filed Oct. 28, 2008, the contents of all of which are incorporated herein by reference in their entirety.

TECHNICAL FIELD

The present invention relates to a vehicle peripheral display device provided with an image acquisition unit for acquiring a peripheral image captured from a vehicle by an image pickup device provided to the vehicle, and a display device for displaying the peripheral image, the display device being provided inside the vehicle cabin.

BACKGROUND ART

In conventional techniques in this type of vehicle peripheral display device, indicator lines serving as a guide for driving are displayed over a peripheral image captured from a vehicle by an image pickup device, and a driver is thereby assisted in driving. For example, Patent Document 1 discloses a technique whereby an indicator line indicating a predicted trajectory of travel to a target parking position is superimposedly displayed on the basis of such factors as the driver's steering angle during parking of a vehicle.

[Patent Document 1] Japanese Laid-open Patent Application No. 11-334470

DISCLOSURE OF THE INVENTION

Problems that the Invention is Intended to Solve

In the vehicle peripheral display device described above, indicator lines are displayed two-dimensionally on a peripheral image of the vehicle which has three-dimensional depth. Therefore, although the indicator lines should lie on the plane of the road pictured in the peripheral image, the positional relationship between such a peripheral image and the indicator lines is difficult to recognize. It can also be difficult to distinguish between lines drawn on the road and the indicator lines, for example, and the indicator lines are sometimes difficult to recognize intuitively.

The present invention was developed in view of the foregoing problems, and an object of the present invention is to provide a peripheral display device whereby indicator lines are easily recognized.

Means for Solving the Problems

A first aspect of the present invention comprises an image acquisition unit for acquiring a peripheral image of a vehicle, the peripheral image being captured by an image pickup device provided to the vehicle; a display device for displaying the peripheral image, the display device being provided inside a vehicle cabin; and an indicator line output unit for causing an indicator line serving as a guide for a driver during a driving operation to be displayed superimposed on the peripheral image, at least one of a shadow portion and a side surface portion adjacent to the indicator line being added to the indicator line.

According to this aspect, when the shadow portion is provided, a visual effect can be created in which the indicator line appears to float over the vehicle peripheral image, which is endowed with three-dimensional depth by the shadow portion. In other words, the visual effect created is as if an indicator line actually placed on a road surface or the like pictured in the peripheral image is seen by a vehicle occupant from the driver seat. As a result, it is possible to ensure that the driver comprehends the indicator line, and the indicator line can be appropriately presented to the driver.

When the side surface portion is provided, since the indicator line superimposed on the peripheral image is displayed in three-dimensional fashion by the side surface portion, the indicator line is displayed three-dimensionally on the vehicle peripheral image, which has three-dimensional depth, and the positional relationship between the peripheral image and the indicator line can easily be recognized. For color-blind drivers, since the side surface portion is added to the displayed indicator line, the color surface area of the indicator line increases, and the indicator line is easier to recognize. On the other hand, for drivers who are not color blind, the three-dimensional display of the indicator line prevents the thickness of the line from being emphasized. As a result, the vehicle occupant can clearly recognize the positional relationship between the peripheral image and the indicator line.

When both the shadow portion and the side surface portion are provided, the indicator line is displayed even more three-dimensionally, and the positional relationship between the peripheral image and the indicator line is easily recognized.

According to a second aspect of the present invention, the indicator line output unit adds and displays the shadow portion adjacent to the side surface portion.

According to this aspect, since the shadow portion is displayed adjacent to the side surface portion, the display on the display device is more organized, and the positional relationship between the peripheral image and the indicator line is easier to recognize than in a case in which the side surface portion and the shadow portion are separated.

According to a third aspect of the present invention, the indicator line output unit adds and displays the side surface portion on the side of the indicator line close to the image pickup device.

According to this aspect, it is possible to create a visual effect which is as if a three-dimensional indicator line actually placed on a road surface or the like pictured in the peripheral image is seen by a vehicle occupant from the driver seat. As a result, the vehicle occupant can more reliably recognize the positional relationship between the peripheral image and the indicator line. The peripheral image and the indicator line can also be even more clearly distinguished.

According to a fourth aspect of the present invention, the indicator line output unit adds and displays the shadow portion on the side of the indicator line close to the image pickup device.

According to this aspect, a visual effect is created in which the indicator line appears to float over the peripheral image, and a visual effect can be created which is as if an indicator line actually placed on a road surface or the like pictured in the peripheral image is seen by a vehicle occupant from the driver seat.

According to a fifth aspect of the present invention, the indicator line is a broken line.

According to this aspect, the region of the peripheral image that is covered by the indicator line can be reduced in size. The vehicle occupant can therefore accurately comprehend the peripheral image.

According to a sixth aspect of the present invention, the indicator line is intermittently arranged and drawn as an indicator having an arbitrary shape.

According to this aspect, it is possible to clearly distinguish between the indicator line and lines which are original to the peripheral image, such as white lines on a road or parking space lines, for example.

According to a seventh aspect of the present invention, the indicator line output unit displays the indicator line and the side surface portion or shadow portion added to the indicator line so as to have a smaller width the greater the distance is from the image pickup device.

According to this aspect, perspective can be imparted to the indicator line, and the vehicle occupant can more reliably comprehend the positional relationship of the indicator line in the peripheral image.

According to an eighth aspect of the present invention, the indicator line is a parking frame line for indicating a parking space.

According to this aspect, a parking space can easily be recognized on the screen of the display device, and the operation of parking the vehicle can be made easier for the vehicle occupant during parking.

According to a ninth aspect of the present invention, the indicator line is an predicted trajectory line which extends in the direction of travel of the vehicle and indicates the predicted trajectory of movement of the vehicle in accordance with a steering angle.

According to this aspect, the predicted trajectory line is easily recognized on the screen of the display device.

According to a tenth aspect of the present invention, the indicator line is an extension from the vehicle width, extending in the direction of travel of the vehicle.

According to this aspect, the extension line of the vehicle width is easily recognized on the screen of the display device. The "vehicle width" referred to herein is the maximum width of the vehicle in the left-right direction. However, for safety purposes, this vehicle width may be set to a value larger than the actual maximum width.

According to an eleventh aspect of the present invention, the indicator line is a distance reference line as a reference of forward distance from a front end of the vehicle or rearward distance from a rear end of the vehicle.

According to this aspect, the distance reference line is easily recognized on the screen of the display device.

BEST MODE FOR CARRYING OUT THE INVENTION

Following is a description of an example in which the peripheral display device of the present invention is applied to a parking assistance device for assisting in the operation of parking a vehicle.

First Embodiment

Figure 1:
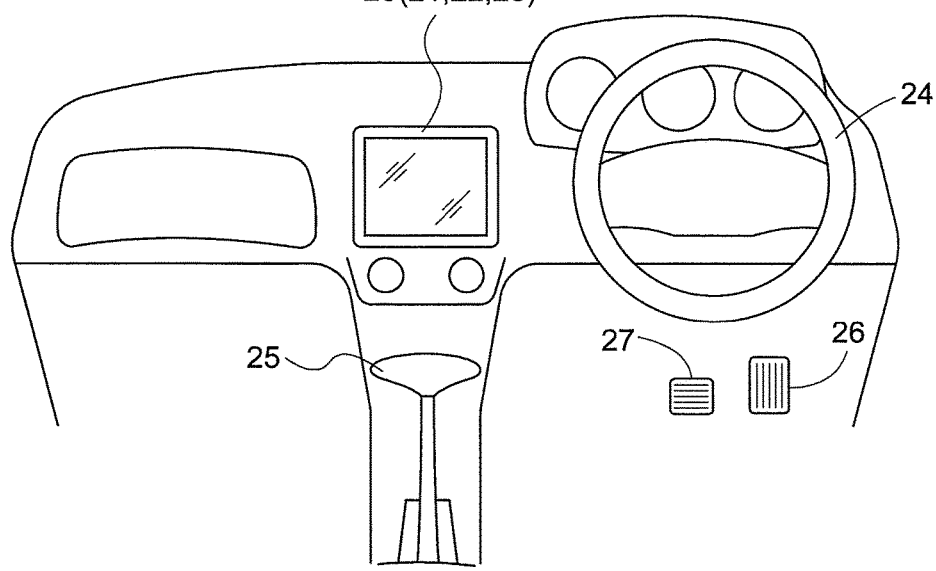
FIG. 1 is a forward view from the driver seat of the vehicle.
Figure 2:
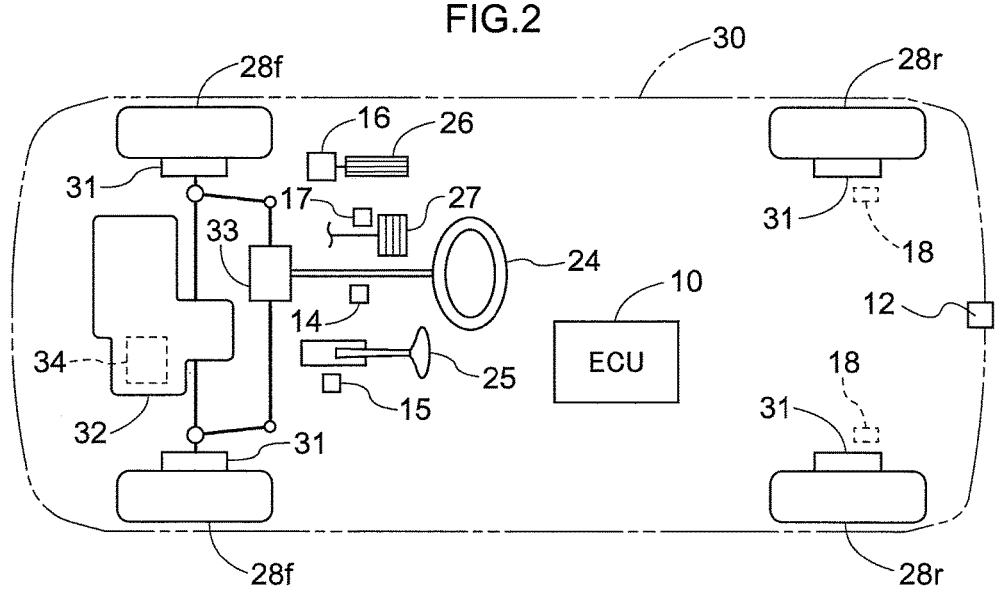
FIG. 2 is a block diagram showing the basic configuration of the vehicle.

FIGS. 1 and 2 show the basic configuration of a vehicle 30 provided with the parking assistance device. A steering wheel 24 provided at the driver seat is coupled with a power steering unit 33, and transmits a rotational operating force to front wheels 28*f* to steer the vehicle 30. The front wheels 28*f* correspond to steering wheels in the present invention. An engine 32 and a speed change mechanism 34 which has a torque converter, CVT, or the like for changing the speed of a drive power from the engine 32 and transmitting the drive power to the front wheels 28*f* or rear wheels 28*r* are disposed at the front of the vehicle body. Drive power is transmitted to one or both of the front wheels 28*f* and the rear wheels 28*r* according to the drive system (front-wheel drive, rear-wheel drive, four-wheel drive) of the vehicle 30. An accelerator pedal 26 as accelerator means for controlling the travel speed, and a brake pedal 27 for exerting braking force on the front wheels 28*f* and the rear wheels 28*r* via brake devices 31 of the front wheels 28*f* and rear wheels 28*r* are arranged parallel to each other in the vicinity of the driver seat.

A monitor 20 (display device) in which a touch panel 23 is formed in a display portion 21 is provided at the top of a console in the vicinity of the driver seat. In the present embodiment, the monitor 20 is a liquid crystal monitor provided with a backlight. The monitor 20 is also provided with a speaker 22. A pressure-sensitive panel or electrostatic panel is used as the touch panel 23, and the position of touch by a finger or the like is outputted as location data. As described hereinafter, the touch panel 23 of the monitor 20 is used as an instruction inputting means at the start of parking assistance in the present embodiment. In a case in which the vehicle 30 is equipped with a navigation system, the monitor 20 is preferably also used as the display device of the navigation system.

The monitor 20 may also be a plasma display or CRT display, and the speaker 22 may be provided in another location, such as inside a door. When another switch or the like is provided as instruction inputting means at the start of parking assistance, the touch panel 23 of the monitor 20 need not necessarily be used as the instruction inputting means of the parking assistance device.

A steering wheel sensor 14 for measuring a steering direction and amount is provided to the operating system of the steering wheel 24. A shift position sensor 15 for determining the shift position is provided to the operating system of a shift lever 25. An accelerator sensor 16 for measuring the accelerator position is provided to the operating system of the accelerator pedal 26. A brake sensor 17 for detecting whether the brake is being operated is provided to the operating system of the brake pedal 27.

Rotation sensors 18 for measuring the rotation amount of at least one of the front wheels 28f and the rear wheels 28r are provided as movement distance sensors. In the present embodiment, a case is described in which rotation sensors 18 are provided to the rear wheels 28r. A configuration may also be adopted in which the movement distance is measured by measuring the amount of movement of the vehicle 30 from the amount of rotation of the drive system in the speed change mechanism 34. An ECU (electronic control unit) 10 for travel control including parking assistance is provided in the vehicle 30 as the central core of the parking assistance device of the present invention.

A camera 12 for capturing an image of the scene to the rear of the vehicle 30 is provided at the rear of the vehicle 30. The camera 12 houses a CCD (charge coupled device), CIS (CMOS image sensor) or other imaging element, and is a digital camera for outputting information imaged by the imaging element as video information in real time. The camera 12 is provided with a wide-angle lens, and has a field of view of approximately 140 degrees to the left and right, for example. The camera 12 is set so as to have a depression angle of about 30 degrees, for example, toward the rear of the vehicle 30, and captures an image of a region extending about 8 m generally to the rear. The captured image is inputted to the ECU 10 and utilized for such purposes as parking assistance.

Figure 3:
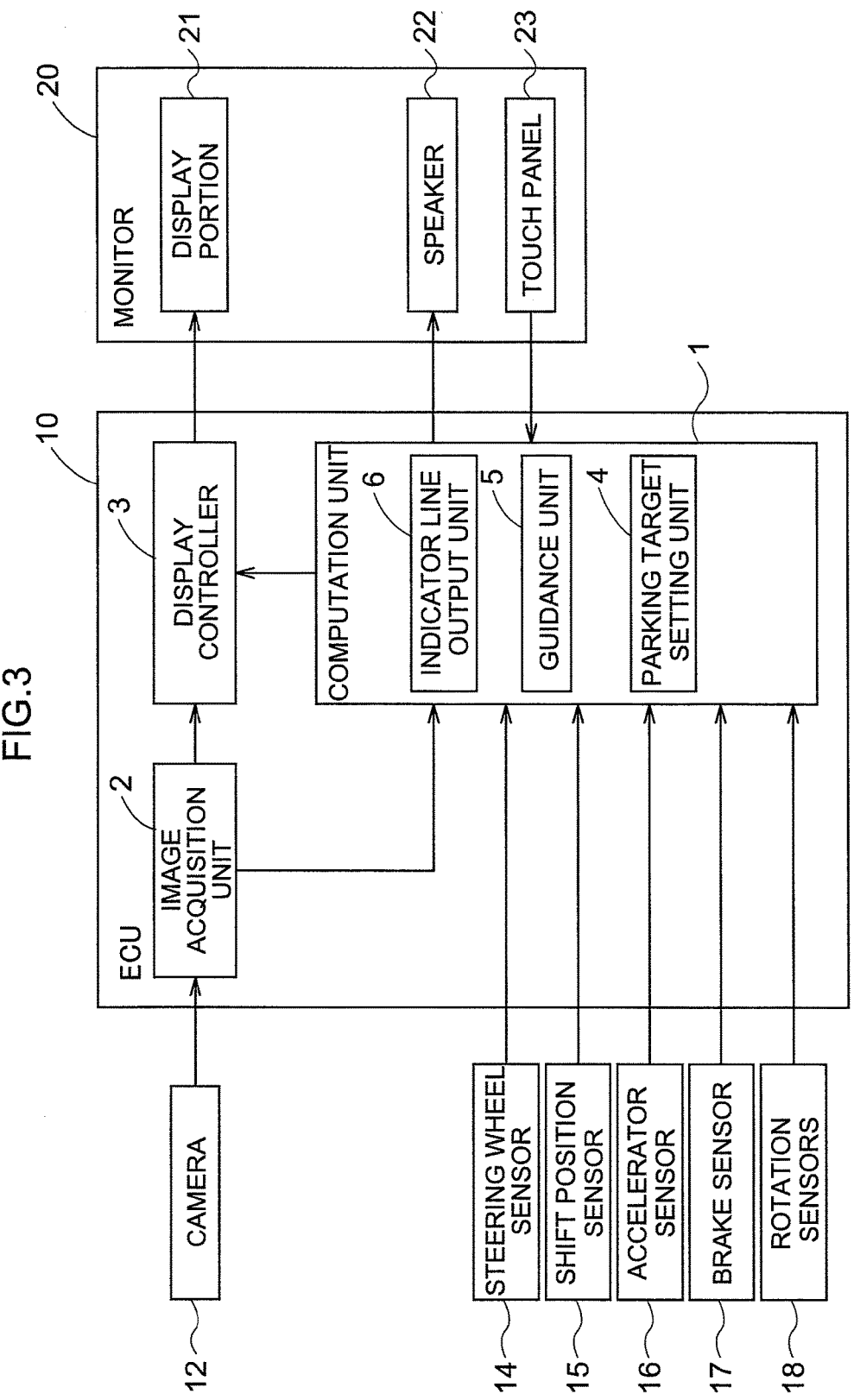
FIG. 3 is a block diagram showing a schematic view of an example of the configuration of the parking assistance device according to the present invention.

FIG. 3 is a block diagram showing a schematic view of an example of the configuration of the parking assistance device according to the present invention, the main core of which is formed by the ECU 10. As shown in FIG. 3, the ECU 10 is composed of a computation unit 1, an image acquisition unit 2, a display controller 3, and other functional units. The computation unit 1 is a functional unit for computing the guidance path or the like described hereinafter, and has a parking target setting unit 4, a guidance unit 5, an indicator output unit 6, and other functional units. The above functional units of the ECU 10 are based on a microcomputer, DSP (digital signal processor) or other arithmetic-logic hardware, and are implemented in coordination with a program or other software that is executed by the hardware. Consequently, the functional units merely represent divisions of functioning, and are not necessarily comprised of independent physical units. The ECU 10 also includes frame memory and various other types of memory for image storage, as well as image processing circuits and various other types of electronic circuits. The configuration and functions of these various types of memory and electronic circuits are publicly known, and are therefore not shown or described in detail herein.

The image acquisition unit 2 is a functional unit for acquiring a peripheral image captured by the camera 12 (image pickup device) from the vehicle 30. The image acquisition unit 2 has frame memory for image storage, a synchronizing separator circuit, and other components. The display controller 3 is a functional unit for displaying the peripheral image captured by the camera 12 from the vehicle 30 on the monitor 20 (display device) inside the vehicle cabin.

The computation unit 1 sets the parking target position P3 (see FIG. 4) of the vehicle 30 and computes the guidance path to the parking target position P3. In the present embodiment, the parking target position P3 is set and the guidance path to the parking target position P3 is computed using the substantial center portion Q of the axle of the rear wheels 28r of the vehicle 30 as a reference point for the vehicle. The computation unit 1 also generates an indicator line as an indicator for guiding the driving operations performed by the driver. The parking target setting unit 4 of the computation unit 1 is a functional unit for setting the parking target position P3 of the vehicle 30. The guidance unit 5 of the computation unit 1 is a functional unit for computing the guidance path to the parking target position P3. Detection results from the steering wheel sensor 14, the shift position sensor 15, the accelerator sensor 16, the brake sensor 17, the rotation sensors 18, and other sensors are inputted to the computation unit 1, and the parking target position P3 and the guidance path are computed based on the detection results from the sensors. The indicator line output unit 6 of the computation unit 1 generates an indicator line for guiding the driver, and causes the indicator line to be displayed superimposed on the peripheral image via the display controller 3.

Figure 5:
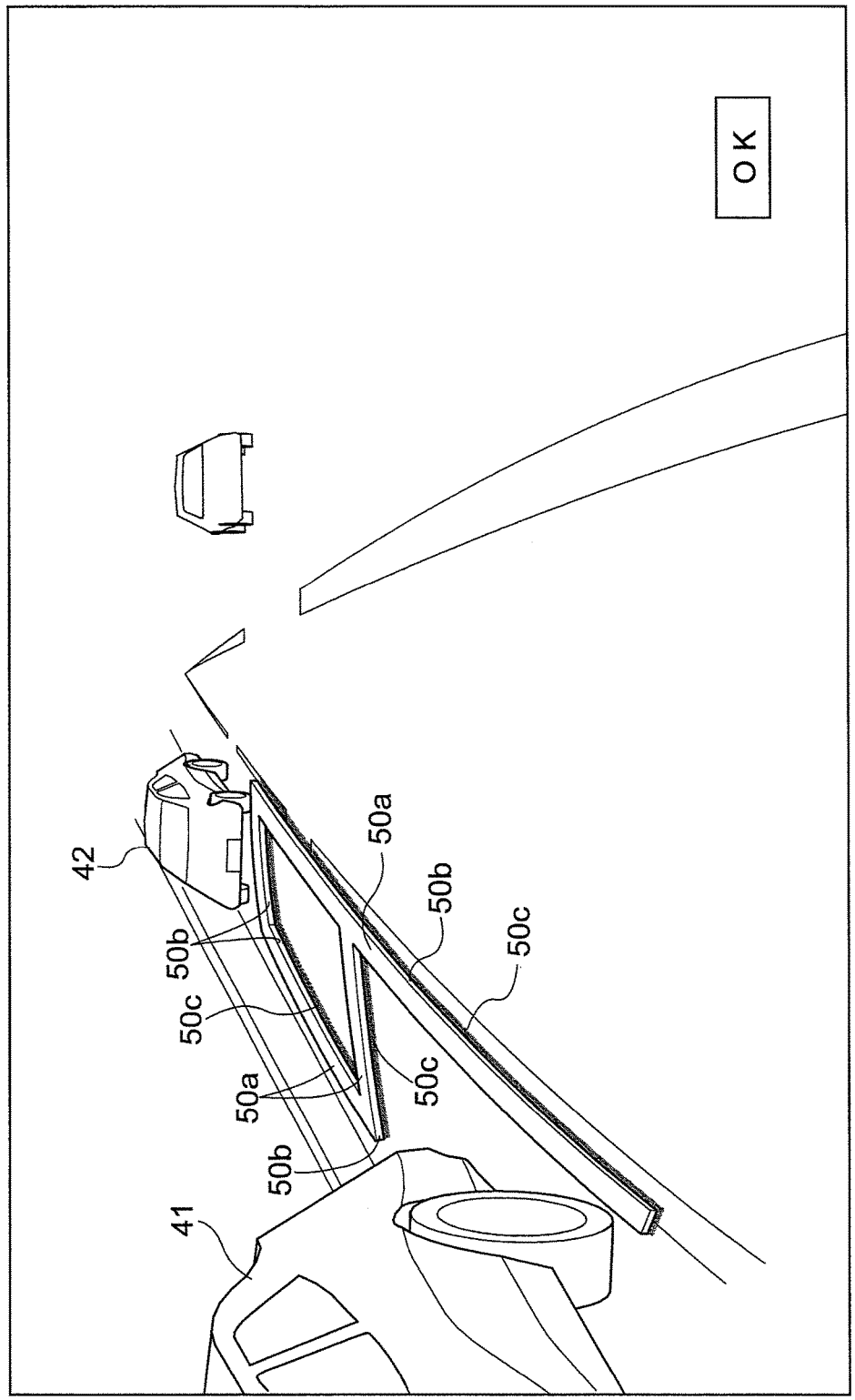
FIG. 5 is a view showing an example of the peripheral image displayed on the monitor during parallel parking.

FIG. 5 is a view showing the screen of the monitor 20 in which parking frame lines 50a (as an example of the indicator line) indicating a parking space E are displayed superimposed on the peripheral image in a case of parallel parking between two parked vehicles. As shown in FIG. 5, profile lines 50b extending along the parking frame lines 50a and shadow lines 50c extending along the profile lines 50b are added to the parking frame lines 50a. In the present embodiment, profile lines 50b (corresponding to the side surface portion of the present invention) and shadow lines 50c (corresponding to the shadow portion of the present invention) having a smaller width than the parking frame lines 50a are added to wide parking frame lines 50a. Although not particularly limited, the parking frame lines 50a, profile lines 50b, and shadow lines 50c are displayed in blue, for example, and the brightness progressively decreases, i.e., the color becomes closer to black in the stated order of the parking frame lines 50a, the profile lines 50b, and the shadow lines 50c. As shall be apparent, this configuration is not limiting, and the lines may be red, yellow, or another color other than blue, or each line may be of a different hue. The parking frame lines 50a are thereby displayed three-dimensionally in superimposed fashion on the peripheral image. The parking frame lines can therefore be highlighted, and the vehicle occupant can clearly distinguish between the peripheral image and the parking frame lines 50a.

Figure 6:
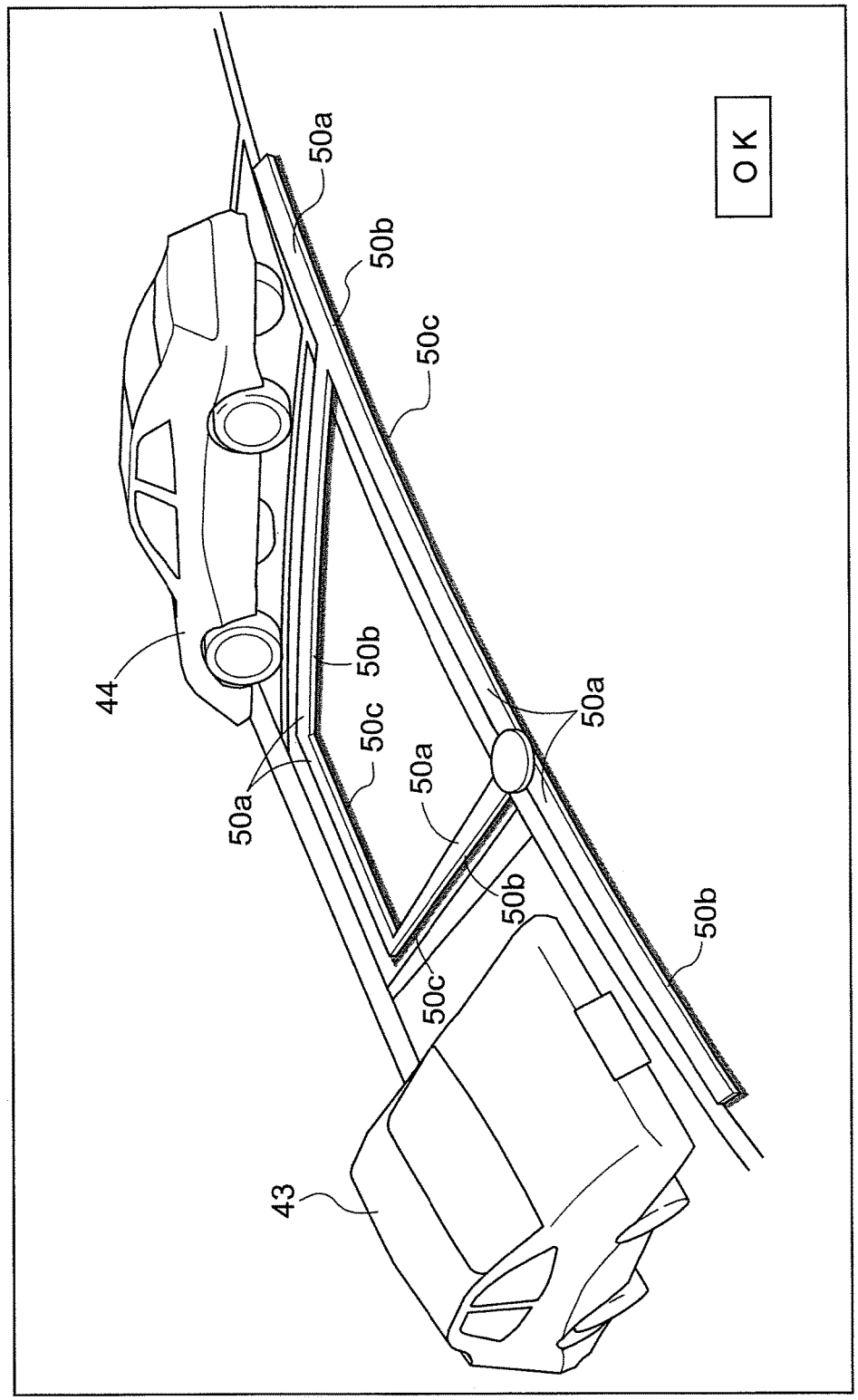
FIG. 6 is a view showing an example of the peripheral image displayed on the monitor during double parking.

FIG. 6 is a view showing the screen of the monitor 20 in which parking frame lines 50a indicating a parking area are displayed superimposed on the peripheral image in a case of double parking between two vehicles. In the case of double parking as well, profile lines 50b and shadow lines 50c are added to the parking frame lines 50a, and the parking frame lines 50a are displayed three-dimensionally on the peripheral image. The parking frame lines can therefore be highlighted, and the vehicle occupant can clearly distinguish between the peripheral image and the parking frame lines 50a.

Figure 7:
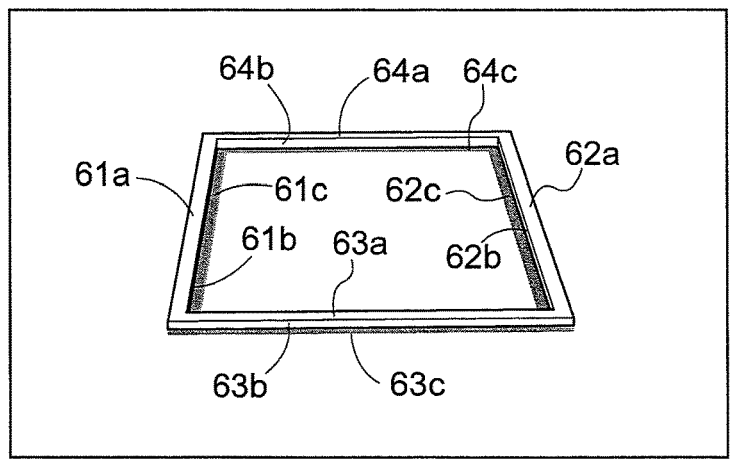
FIG. 7 is a view showing an example of profile lines and shadow lines.
Figure 8:
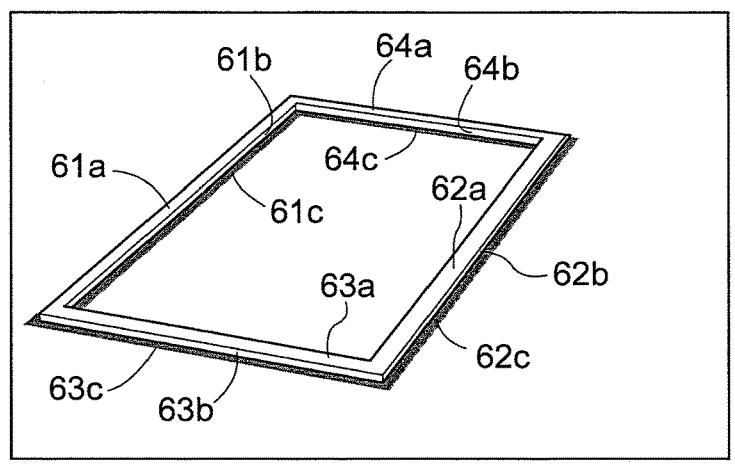
FIG. 8 is a view showing an example of profile lines and shadow lines.
Figure 9:
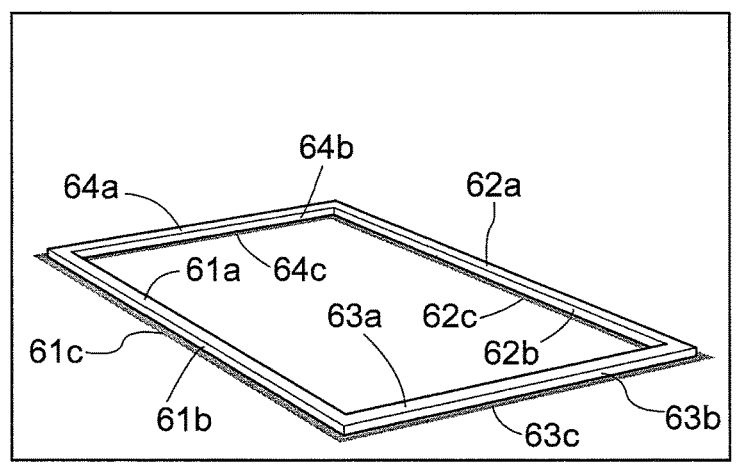
FIG. 9 is a view showing an example of profile lines and shadow lines.

FIGS. 7, 8, and 9 are views showing an example of the manner in which the profile lines and the shadow lines are added to the parking frame lines. In the present embodiment, the profile lines and the shadow lines are added to the parking frame lines along the sides thereof close to the camera 12. In other words, as shown in FIG. 7, when the camera 12 is positioned in the width direction of the vehicle 30 between a pair of left and right parking frame lines 61a, 62a extending along the travel direction of the vehicle 30, the profile lines 61b, 62b and shadow lines 61c, 62c are each added on the inside of the parking frame lines 61a, 62a. For the pair of parking frame lines 63a, 64a which extend in the direction intersecting the pair of left and right parking frame lines 61a, 62a, profile lines 63b, 64b and shadow lines 63c, 64c are added along the side close to the vehicle.

As shown in FIG. 8, when the camera 12 is positioned further to the right than the right-side parking frame line 62a of the pair of left and right parking frame lines 61a, 62a extending along the travel direction of the vehicle 30, the profile lines 61b, 62b and the shadow lines 61c, 62c are added on the right sides of the parking frame lines 61a, 62a on the monitor 20. As shown in FIG. 9, when the camera 12 is positioned further to the left than the left-side parking frame line 61a of the pair of left and right parking frame lines 61a, 62a extending along the travel direction of the vehicle 30, the profile lines 61b, 62b and the shadow lines 61c, 62c are added on the left sides of the parking frame lines 61a, 62a on the monitor 20. For the pair of parking frame lines 63a, 64a which extend in the direction intersecting the pair of left and right parking frame lines 61a, 62a, profile lines 63b, 64b and shadow lines 63c, 64c are added along the side close to the vehicle, in the same manner as in FIG. 7. By adding profile lines and shadow lines as described above, a visual effect can be created in which the indicator lines appear to float over the peripheral image, and the vehicle occupant can more clearly distinguish between the peripheral image and the indicator lines.

Figure 4:
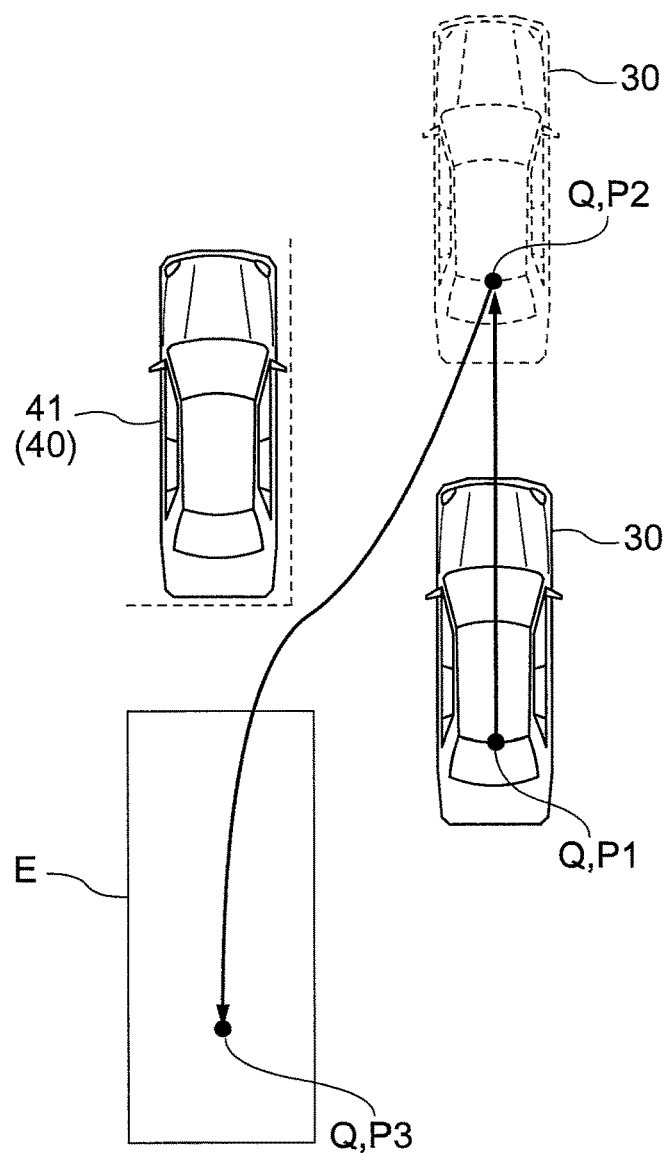
FIG. 4 is a view showing the movement trajectory during parallel parking.

The operation of the parking assistance device will next be described using as an example a case of parallel parking in a parking space E between two parked vehicles 41, 42, as shown in FIG. 4.

The driver advances the vehicle 30 from position P1 to position P2 at which the foreground of the parking space E appears on the monitor 20, and once the driver stops the vehicle, a speed sensor 7b detects that the vehicle 30 is stopped and transmits this detection result to the computation unit 1 of the parking assistance device. When the driver sets the shift lever to the reverse position, the shift position sensor 15 detects that the shift lever is set to reverse and transmits this detection result to the computation unit 1. When the two detection results mentioned above are transmitted to the computation unit 1, the parking target setting unit 4 sets the parking target position P3 on the basis of the peripheral image. The method for setting the parking target position will not be described in detail, but the parking target position is set, for example, through image recognition of the partition lines provided to the parking space E, or of obstacles such as the parked vehicles 41, 42 in front and to the rear.

When the parking target position P3 is set, the guidance unit 5 calculates a guidance path on the basis of the current position P2 of the vehicle and the parking target position P3 set by the parking target setting unit 4. As shown in FIG. 5, the indicator line output unit 6 generates parking frame lines 50a, profile lines 50b, and shadow lines 50c for indicating the parking space E on the basis of the set parking target position P3, and causes the parking frame lines 50a, profile lines 50b, and shadow lines 50c to be displayed superimposed on the peripheral image via the display controller 3.

When there is no need to change the parking target position P3 first set, the parking target position P3 is confirmed when the vehicle occupant touches the "OK" display. When the vehicle occupant wishes to change the set parking target position P3, the vehicle occupant can change the parking target position P3 by operating the touch panel, for example. The parking target position P3 may also be changed by operating the steering wheel.

Once the parking target position P3 is confirmed, the guidance unit 5 detects that the shift lever is set to reverse and that the vehicle occupant has released the brake, and controls the ECU 10 so as the guide the vehicle 30 toward the parking target position P3. A configuration may also be adopted in which the display "Cancel parking assistance" is provided on the screen of the monitor 20, and the driver can cancel parking assistance as needed by touching the display. A configuration may also be adopted in which parking assistance is cancelled when the vehicle occupant operates the brake, the steering wheel, or another component, for example. When the ECU 10 reaches the parking target position, the ECU 10 is controlled so as to stop the vehicle 30 and end parking assistance.

Second Embodiment (1) In the first embodiment, an example is described in which the vehicle 30 is guided by automatic steering to the set parking target position, but this configuration is not limiting. For example, a configuration may be adopted in which a predicted course line of the vehicle is displayed superimposed as an indicator line on the peripheral image, and the driver parks the vehicle by such operations as operating the steering wheel on the basis of the course prediction line, as shown in FIG. 10.

Figure 10:
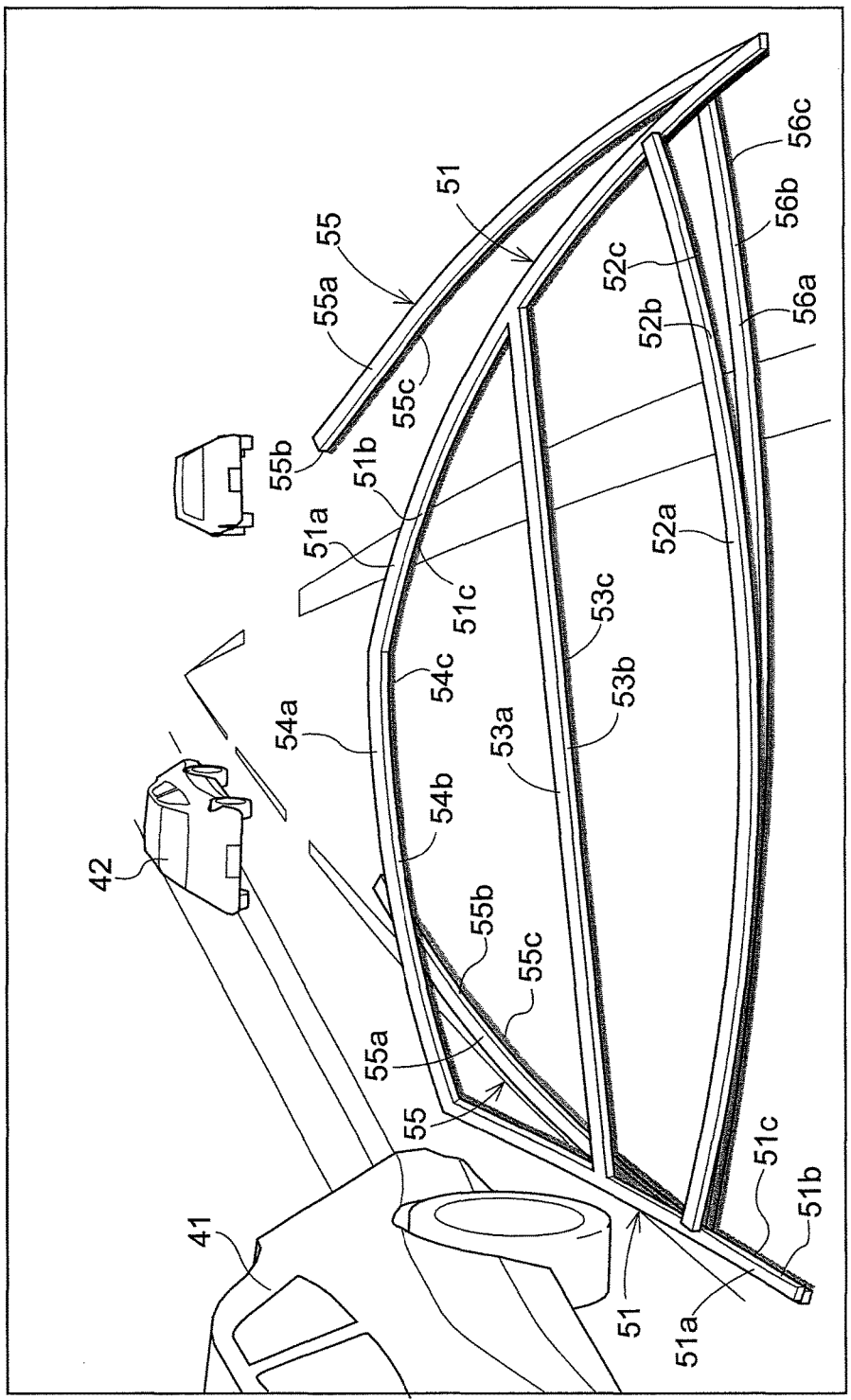
FIG. 10 is a view showing an example of the peripheral image displayed on the monitor in another embodiment.

In the present embodiment, the rearward prediction lines 51 are displayed superimposed on the peripheral image via the display controller 3, as shown in FIG. 10. The rearward prediction lines 51 are indicator lines for indicating the predicted trajectory or the like of backward movement of the vehicle 30 in accordance with the steering angle. The rearward prediction lines 51 extend to the rear of the vehicle 30, and are composed of predicted trajectory lines 51a indicating the predicted trajectory of movement of the rear end of the vehicle 30, and distance reference lines 52a, 53a, 54a as references of distance to the rear from the rear end of the vehicle 30. The distance reference lines 52a, 53a, 54a are a 5 m reference line 54a, a 3 m reference line 53a, and a 1 m warning line 52a in the present example. The rearward prediction lines 51 are basically drawn in yellow. However, the 1 m warning line 52a is displayed in red so as to attract the attention of the driver.

Vehicle rearward lines 55 are also displayed superimposed on the peripheral image. The vehicle rearward lines 55 are indicator lines which indicate a predetermined position to the rear of the vehicle 30 regardless of the steering angle of the vehicle 30. Consequently, this indicator line is displayed superimposed on a predetermined position fixed in the peripheral image according to the optical relationship with the camera 12 mounted to the vehicle 30. The vehicle rearward lines 55 in the present embodiment are composed of vehicle width extension lines 55a which are extensions of the vehicle width, extending to the rear of the vehicle, and a 1 m reference line 56a as a distance reference line. In the present embodiment, the vehicle rearward lines 55 are displayed in green, for example, or another color other than that of the rearward prediction lines 51 in order to be more easily distinguishable from the rearward prediction lines 51. The "vehicle width" herein is the maximum width of the vehicle 30 in the left-right direction, but may be set to a value larger than the actual maximum width for safety purposes.

The indicator line output unit 6 adds profile lines and shadow lines to the rearward prediction lines 51 and vehicle rearward lines 55 in the present embodiment as well. Specifically, profile lines 51b and shadow lines 51c are added on the insides of the pair of left and right predicted trajectory lines 51a of the rearward prediction lines 51, and profile lines 54b, 53b, 52b and shadow lines 54c, 53c, 52c are also added along the sides of the 5 m reference line 54a, 3 m reference line 53a, and 1 m warning line 52a close to the vehicle 30. Profile lines 55b, 56b and shadow lines 55c, 56c are also added on the insides of the pair of left and right vehicle width extension lines 55a and on the vehicle 30 side of the 1 m reference line of the vehicle rearward lines 55. The rearward prediction lines 51 and the vehicle rearward lines 55 are thus three-dimensionally displayed superimposed on the peripheral image.

The driver operates the steering wheel to back the vehicle 30 so that the vehicle 30 does not strike the parked vehicles 41, 42 or other obstacles, and guides the vehicle 30 into the parking space E while referring to the rearward prediction lines 51 and the vehicle rearward lines 55 which are displayed superimposed on the peripheral image. When the driver then confirms that the vehicle 30 is in the parking space E and the vehicle rearward lines 55 are substantially parallel to the parking space E, the driver vehicle 30 stops the vehicle.

In the present embodiment, rearward prediction lines and vehicle rearward lines are described for moving the vehicle 30 in reverse, but this configuration is not limiting. For example, although not shown in the drawings, forward prediction lines and vehicle forward lines may be displayed superimposed on the peripheral image during forward movement of the vehicle 30. In this case, predicted trajectory lines extending in front of the vehicle 30 indicate the predicted trajectory of movement of the vehicle 30 in accordance with the steering angle. Vehicle width extension lines in this case indicate extensions of the vehicle width, and extend forward from the vehicle 30. Furthermore, distance reference lines serve as references of distance forward from the front end of the vehicle 30.

Figure 11:
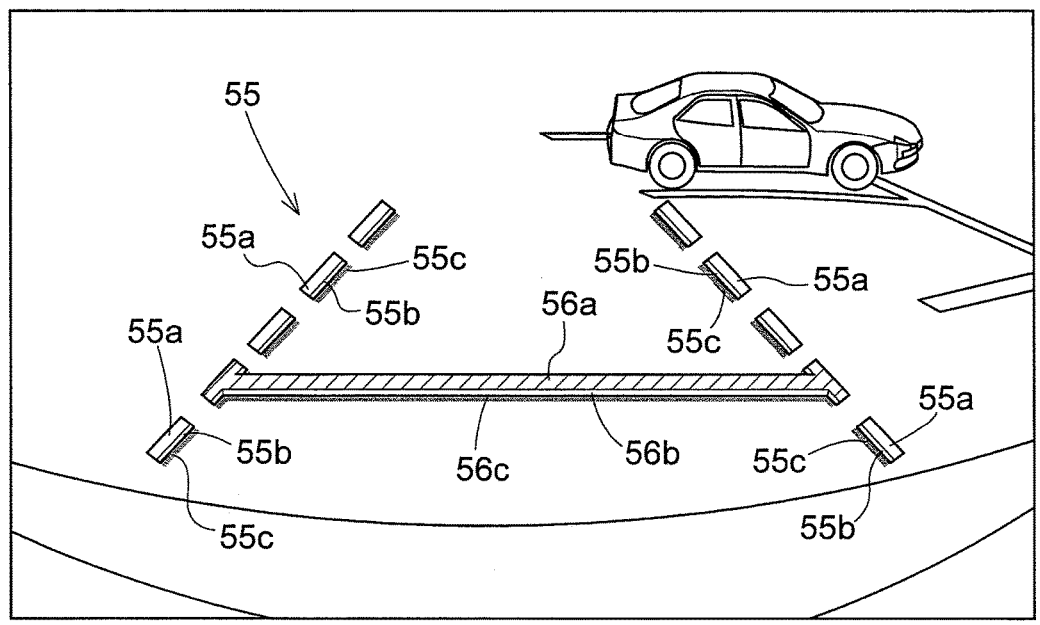
FIG. 11 is a view showing an example of the peripheral image displayed on the monitor in another embodiment.

(2) Cases have so far been described in which the indicator lines are solid lines. However, the indicator lines may be broken lines, for example, or other non-solid lines. A combination of solid lines and broken lines, for example, or other non-solid lines may also be used. FIG. 11 is a view showing an example of the vehicle rearward lines 55 composed of vehicle width extension lines 55a and the 1 m reference line 56a as a distance reference line displayed superimposed on the peripheral image. In this example, the 1 m reference line 56a is displayed as a solid line in the same manner as in the embodiment described above, but the vehicle width extension lines 55a are displayed as broken lines.

In the present embodiment as well, the indicator line output unit 6 adds and displays the profile lines and shadow lines along the sides of the vehicle rearward lines 55 close to the image pickup device (camera 12). In other words, the profile lines 55b, 56b and shadow lines 55c, 56c are added along the vehicle 30 sides of the pair of left and right vehicle width extension lines 55a and the 1 m reference line 56a of the vehicle rearward lines 55. The profile lines 55b and shadow lines 55c are also displayed as broken lines on the broken vehicle width extension lines 55a, and are added in positions corresponding to the broken vehicle width extension lines 55a.

Although not particularly limited, the vehicle width extension lines 55a are displayed in blue, and the 1 m reference line 56a is displayed in red, for example. The profile lines 55b and shadow lines 55c of the vehicle width extension lines 55a are also displayed in blue, but the brightness progressively decreases, i.e., the color becomes closer to black, in the stated order of the vehicle width extension lines 55a, the profile lines 55b, and the shadow lines 55c. The profile lines 56b and shadow lines 56c of the 1 m reference line 56a are also displayed in red, but the brightness progressively decreases in sequence in the 1 m reference line 56a, profile lines 56b, and shadow lines 56c. Of course, this configuration is not limiting, and the lines may be yellow or another color other than described above, or each line may be of a different hue. The vehicle rearward lines 55 are thereby displayed three-dimensionally in superimposed fashion on the peripheral image.

Figure 12:
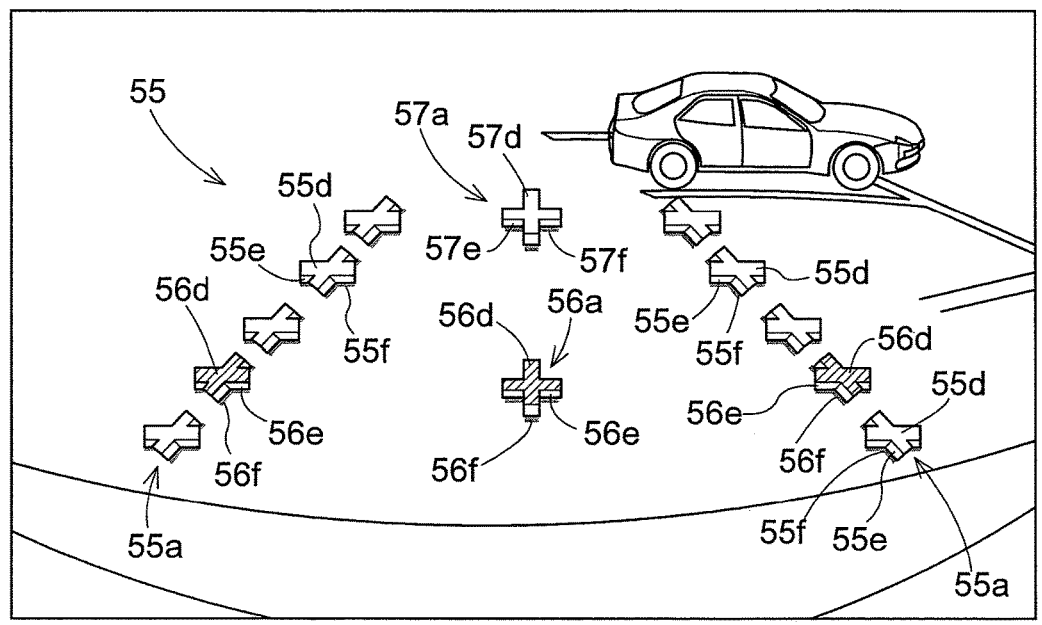
FIG. 12 is a view showing an example of the peripheral image displayed on the monitor in another embodiment.

(3) In a case in which all or some of the indicator lines are displayed as broken lines in the manner described above, the indicator lines may be intermittently arranged and drawn as indicators having an arbitrary shape. FIG. 12 is a view showing an example in which the vehicle width extension lines 55a and vehicle rearward lines 55 composed of the 1 m reference line 56a and a 5 m reference line 57a as distance reference lines are displayed superimposed on the peripheral image. In this example, cross-shaped indicators 55d, 56d, 57d are intermittently arranged, and the vehicle width extension lines 55a and the 1 m reference line 56a and 5 m reference line 57a as distance reference lines are drawn. In this case as well, side surface portions 55e, 56e, 57e and shadow portions 55f, 56f, 57f are added to the indicators 55d, 56d, 57d, respectively, which constitute the vehicle width extension lines 55a, the 1 m reference line 56a, and the 5 m reference line 57a, in the same manner as in the embodiment described above.

(4) Examples have thus far been described in which the indicator line output unit 6 adds side surface portions (profile lines) and shadow portions (shadow lines) to the displayed indicator lines, but both the side surface portions (profile lines) and the shadow portions (shadow lines) need not necessarily be displayed, and a configuration may be adopted in either the side surface portions (profile lines) or the shadow portions (shadow lines) are displayed.

Figure 13:
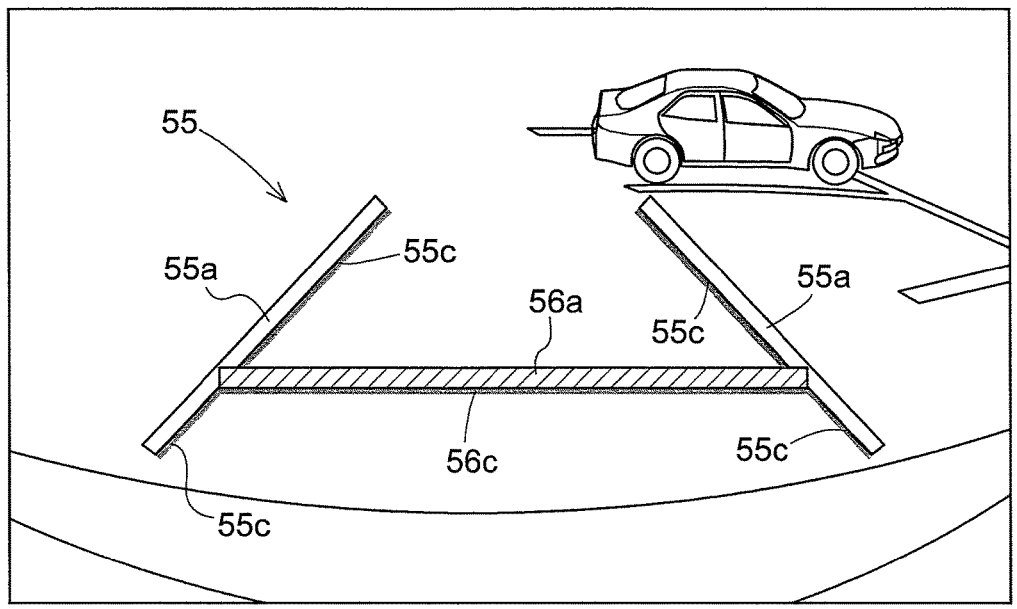
FIG. 13 is a view showing an example of the peripheral image displayed on the monitor in another embodiment.
Figure 14:
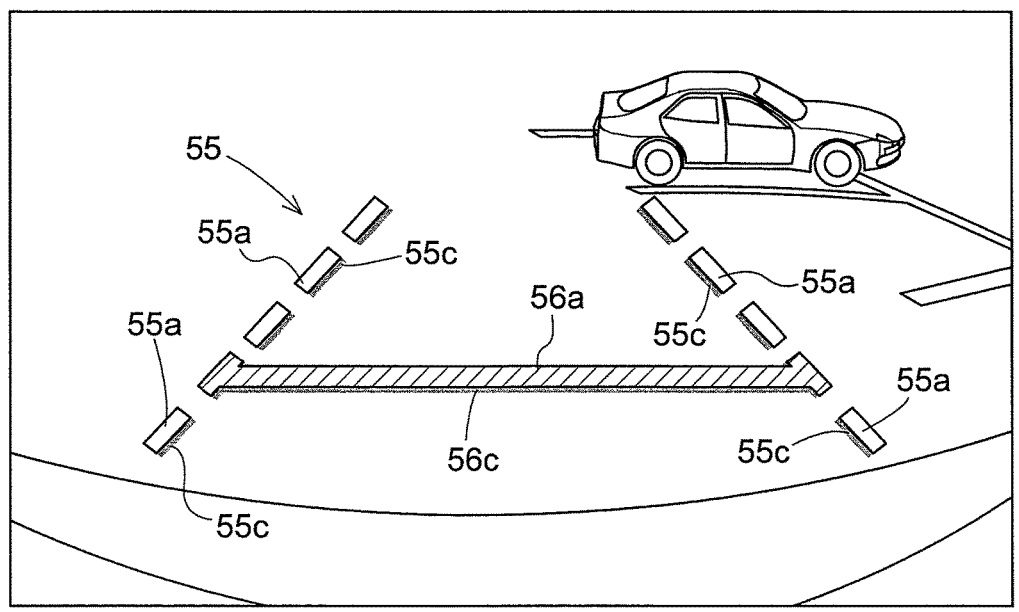
FIG. 14 is a view showing an example of the peripheral image displayed on the monitor in another embodiment.
Figure 15:
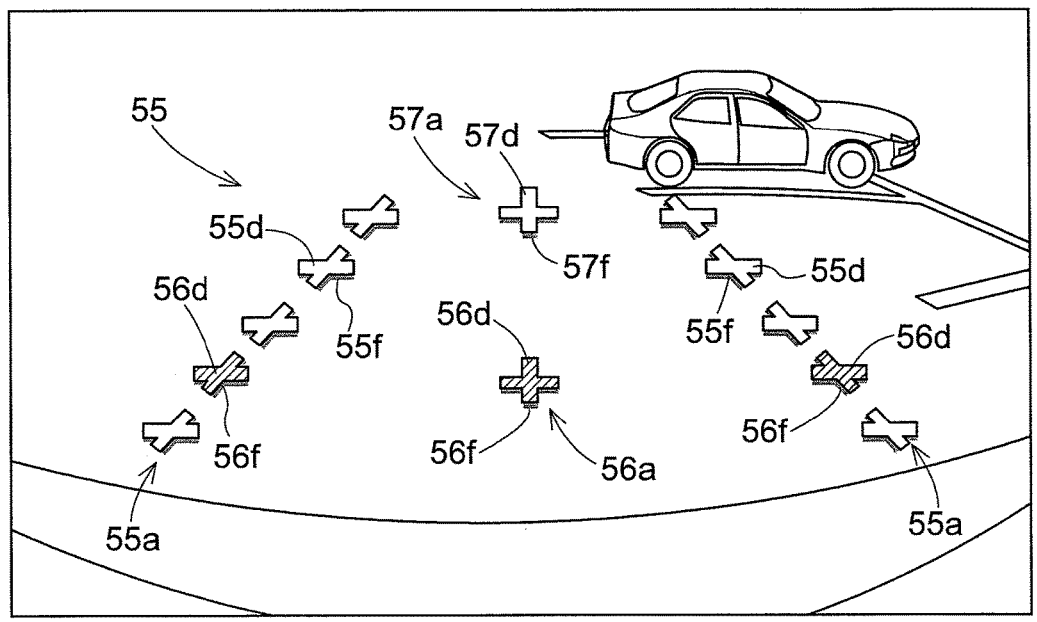
FIG. 15 is a view showing an example of the peripheral image displayed on the monitor in another embodiment.

FIGS. 13 through 15 are views showing examples in which the indicator line output unit 6 adds only the shadow portions (shadow lines) to the displayed indicator lines.

FIG. 13 shows an example in which shadow lines 55c, 56c are added to the vehicle rearward lines 55, composed of solid vehicle width extension lines 55a and a solid 1 m reference line 56a as a distance reference line, and displayed superimposed on the peripheral image. The indicator line output unit 6 adds the shadow lines 55c, 56c along the insides of the pair of left and right vehicle width extension lines 55a and along the vehicle 30 side of the 1 m reference line 56a of the vehicle rearward lines 55.

FIG. 14 shows an example in which vehicle rearward lines composed of broken vehicle width extension lines 55a and a solid 1 m reference line 56a as a distance reference line are displayed superimposed on the peripheral image. In this case as well, the indicator line output unit 6 adds shadow lines along the side portions on the sides of the indicator lines close to the image pickup device. In other words, the shadow lines 55c, 56c are added along the insides of the pair of left and right vehicle width extension lines 55a and along the vehicle 30 side of the 1 m reference line 56a of the vehicle rearward lines 55.

FIG. 15 shows an example in which cross-shaped indicators 55d, 56d, 57d are intermittently arranged, and vehicle width extension lines 55a and a 1 m reference line 56a and 5 m reference line 57a as distance reference lines are drawn. In this case as well, shadow portions 55f, 56f, 57f are added to the indicators 55d, 56d, 57d, respectively, which constitute the vehicle width extension lines 55a, the 1 m reference line 56a, and the 5 m reference line 57a, in the same manner as described above.

Figure 16:
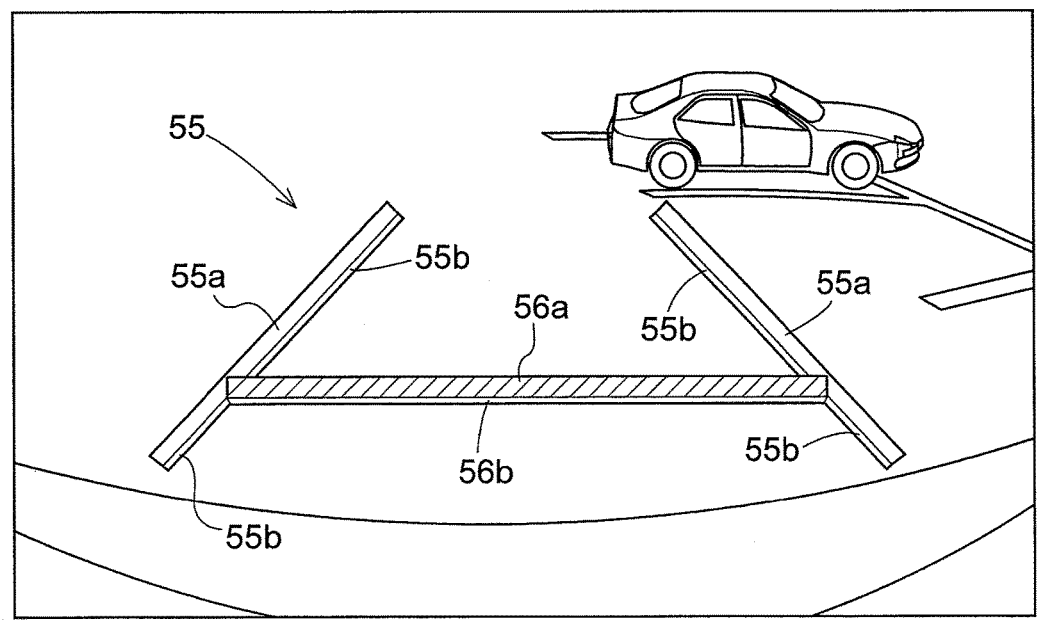
FIG. 16 is a view showing an example of the peripheral image displayed on the monitor in another embodiment.
Figure 17:
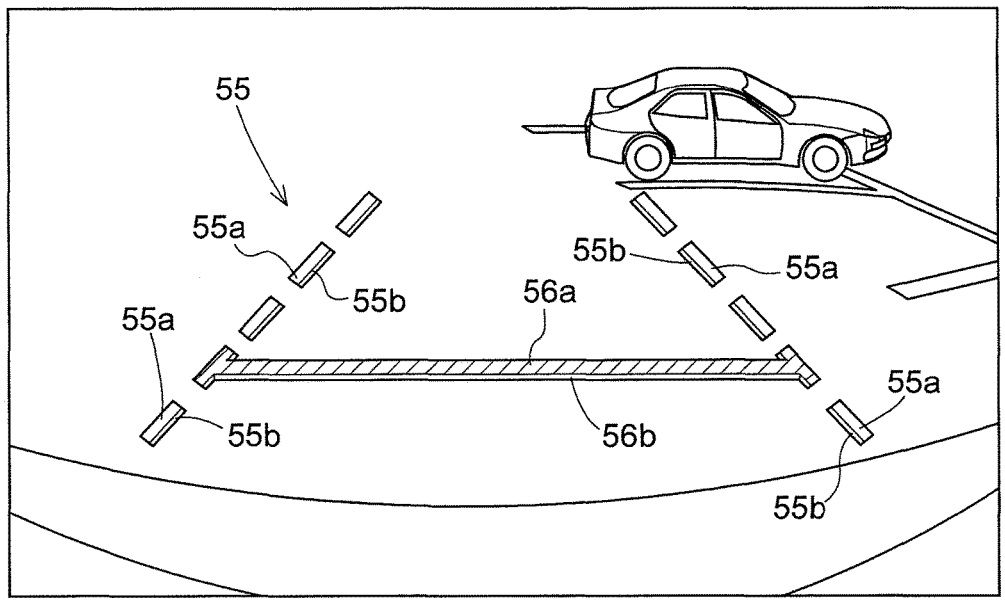
FIG. 17 is a view showing an example of the peripheral image displayed on the monitor in another embodiment.
Figure 18:
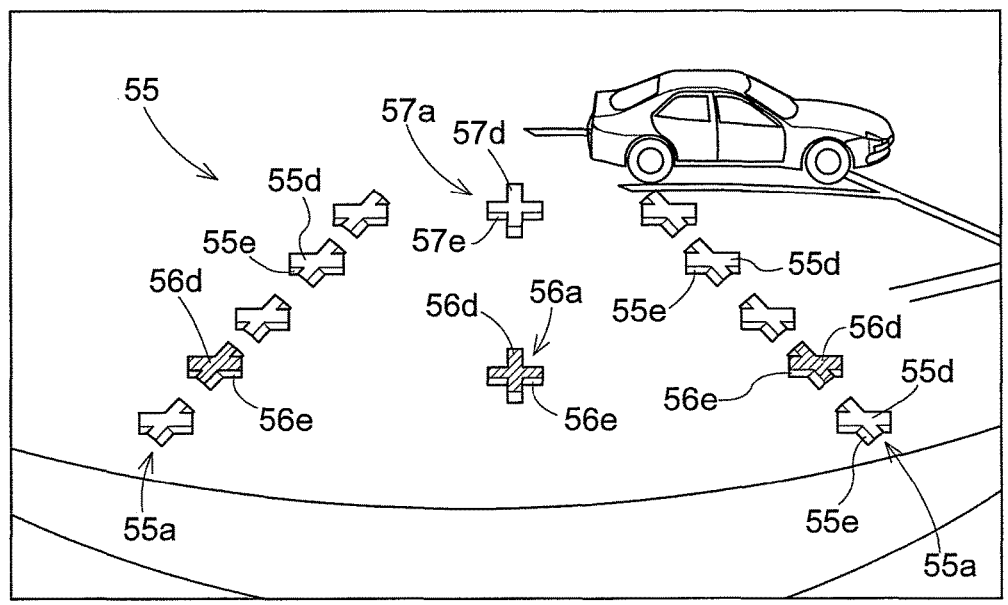
FIG. 18 is a view showing an example of the peripheral image displayed on the monitor in another embodiment.

FIGS. 16 through 18 show examples in which the indicator line output unit 6 adds only the side surface portions (profile lines) to the displayed indicator lines.

FIG. 16 shows an example in which profile lines 55b, 56b are added to the vehicle rearward lines 55, composed of solid vehicle width extension lines 55a and a solid 1 m reference line 56a as a distance reference line, and displayed superimposed on the peripheral image. The indicator line output unit 6 adds the profile lines 55b, 56b along the sides of the indicator lines close to the image pickup device. In other words, the profile lines 55b, 56b are added along the insides of the pair of left and right vehicle width extension lines 55a and along the vehicle 30 side of the 1 m reference line 56a of the vehicle rearward lines 55.

FIG. 17 is a view showing an example in which vehicle rearward lines composed of broken vehicle width extension lines 55a and a solid 1 m reference line 56a as a distance reference line are displayed superimposed on the peripheral image. In this case as well, the indicator line output unit 6 adds profile lines along the side portions on the sides of the indicator lines close to the image pickup device. In other words, the profile lines 55b, 56b are added along the insides of the pair of left and right vehicle width extension lines 55a and along the vehicle 30 side of the 1 m reference line 56a of the vehicle rearward lines 55.

FIG. 18 shows an example in which cross-shaped indicators 55d, 56d, 57d are intermittently arranged, and vehicle width extension lines 55a and a 1 m reference line 56a and 5 m reference line 57a as distance reference lines are drawn. In this case as well, side surface portions 55e, 56e, 57e are added to the indicators 55d, 56d, 57d, respectively, which constitute the vehicle width extension lines 55a, the 1 m reference line 56a, and the 5 m reference line 57a, in the same manner as described above.

(5) In the first embodiment described above, the indicator line output unit 6 may be configured so that the width of the indicator lines, profile lines, and shadow lines decreases as the distance from the camera 12 increases. In other words, in the case of the first embodiment described above (with reference to FIGS. 7 through 9), the pair of left and right parking frame lines 61a, 62a which extend along the cruising lane of the vehicle 30, and the profile lines 61b, 62b and shadow lines 61c, 62c added to the parking frame lines 61a, 62a are displayed so as to decrease in width the greater the distance is from the vehicle 30. Moreover, in the pair of parking frame lines 63a, 64a extending in the direction perpendicular to the cruising lane, and the profile lines 63b, 64b and shadow lines 63c, 64c added along the parking frame lines 63a, 64a, the parking frame line 63a, profile line 63b, and shadow line 63c on the side toward the vehicle are displayed so as to have a greater width than the parking frame line 64a, profile line 64b, and shadow line 64c on the side away from the vehicle 30.

In the case of the second embodiment described above (with reference to FIG. 10), the pair of left and right predicted trajectory lines 51a among the rearward prediction lines 51, and the profile lines 51b and shadow lines 51c added to the predicted trajectory lines 51a are displayed so as to decrease in width the farther each line is from the vehicle. The distance reference lines are also displayed so as to have a smaller width the more separated the distance reference lines are from the vehicle 30. In the case of this embodiment, the widths of the position reference lines are set so as decrease in order for the 1 m warning line 52a, the 3 m reference line 53a, and the 5 m reference line 54a. The profile lines 52b, 53b, 54b and shadow lines 52c, 53c, 54c added to the position reference lines are also set so as to decrease in width in the same manner the farther each line is from the vehicle 30. The pair of left and right vehicle width extension lines 55a of the vehicle rearward lines 55, and the profile lines 55b and shadow lines 55c are also displayed so as to decrease in width the farther each line is from the vehicle.

(6) In the embodiments described above, examples are described in which the vehicle peripheral display device is applied to a parking assistance device, but this configuration is not limiting. The vehicle peripheral display device can also be applied in cases in which indicator lines are displayed superimposed on a peripheral image during driving operations other than parking.

INDUSTRIAL APPLICABILITY

The vehicle peripheral display device of the present invention can be applied to such devices as a parking assistance device for assisting a driver with a driving operation, whereby the indicator lines displayed by the display device are easily recognized, and the driver can clearly recognize the positional relationship between the peripheral image and the indicator lines.

The invention claimed is:
1. A vehicle peripheral display device comprising:
an image acquisition unit for acquiring a peripheral image of a vehicle, the peripheral image being captured by an image pickup device provided to the vehicle;
a display device for displaying the peripheral image, the display device being provided inside a vehicle cabin; and
an indicator line output unit for causing indicator lines serving as a guide for a driver during a driving operation to be displayed superimposed on the peripheral image,
wherein the indicator lines includes a pair of first indicator lines spaced apart from each other in a width direction of the vehicle and extending in a travel direction of the vehicle, and a pair of second indicator lines extending in a direction intersecting the pair of first indicator lines,
wherein side surface portions are added to the sides of the pair of second indicator lines close to the image pickup device for parking assist,
wherein the indicator line output unit adds and displays shadow portions adjacent to the side surface portions, and
wherein the shadow portions includes a pair of first shadow portions added to the sides of the pair of first indicator lines close to the image pickup device, and a pair of second shadow portions added to the side surface portions added to the pair of second indicator lines.

2. The vehicle peripheral display device according to claim 1,
wherein the indicator lines include a predicted trajectory line which extends in the direction of travel of the vehicle and indicates the predicted trajectory of movement of the vehicle in accordance with a steering angle, and
the indicator line output unit causes the predicted trajectory line to be displayed superimposed on the peripheral image.

3. The vehicle peripheral display device according to claim 1,
wherein the indicator lines include an extension from the vehicle width, extending in the direction of travel of the vehicle, and
the indicator line output unit causes the extension to be displayed superimposed on the peripheral image.

4. The vehicle peripheral display device according to claim 1,
wherein the indicator lines include a distance reference line used as a reference of forward distance from a front end of the vehicle or rearward distance from a rear end of the vehicle, and
the indicator line output unit causes the distance reference to be displayed superimposed on the peripheral image.

5. The vehicle peripheral display device according to claim 1,
wherein the indicator lines include a parking frame line for indicating a parking space, and
the indicator line output unit causes the parking frame line to be displayed superimposed on the peripheral image.

6. The vehicle peripheral display device according to claim 1,
wherein the peripheral image has three-dimensional depth and the indicator line output unit displays the side surface portions so that the indicator lines are displayed in three dimensional fashion by the side surface portions over a road surface in the peripheral image.

7. The vehicle peripheral display device according to claim 1,
wherein the indicator lines are broken lines.

8. The vehicle peripheral display device according to claim 1,
wherein the indicator lines are intermittently arranged and drawn as indicators having an arbitrary shape.

9. The vehicle peripheral display device according to claim 1,
wherein the indicator line output unit displays the indicator lines and the side surface portions or shadow portions added to the indicator lines so as to have a smaller width the greater the distance is from the image pickup device.

10. The vehicle peripheral display device according to claim 1, wherein the control unit detects the parking operation in response to detecting a shift to a reverse operation of the vehicle.

11. The vehicle peripheral display device according to claim 1, wherein the indicator line output unit displays the side surface portions so that the indicator lines appear to float over a road surface in the peripheral image.

12. The vehicle peripheral display device according to claim 1, wherein a brightness of the side surface portions provided in the indicator lines for giving parking assist during a parking operation is set to be lower than a brightness of the indicator lines.

* * * * *